US008330443B2

(12) United States Patent
Ertl et al.

(10) Patent No.: US 8,330,443 B2
(45) Date of Patent: Dec. 11, 2012

(54) CIRCUIT ARRANGEMENT AND METHOD FOR CONTROLLING POWER CONVERTERS

(75) Inventors: Bernhard Ertl, Puchheim (DE); Torsten Kuske, Grosshartpenning (DE)

(73) Assignee: Osram AG, Munich (DE)

( * ) Notice: Subject to any disclaimer, the term of this patent is extended or adjusted under 35 U.S.C. 154(b) by 679 days.

(21) Appl. No.: 12/400,496

(22) Filed: Mar. 9, 2009

(65) Prior Publication Data

US 2009/0224742 A1 Sep. 10, 2009

Related U.S. Application Data

(60) Provisional application No. 61/068,803, filed on Mar. 10, 2008.

(51) Int. Cl.
*G05F 1/40* (2006.01)
(52) U.S. Cl. .......................................... 323/283; 323/222
(58) Field of Classification Search .................. 323/222, 323/282–288; 327/206, 427, 377, 483; 315/94, 315/219, 291, 307, 309; 363/16–20, 21.07, 363/21.12, 41, 79, 80
See application file for complete search history.

(56) References Cited

U.S. PATENT DOCUMENTS

| | | | | |
|---|---|---|---|---|
| 5,260,861 A * | 11/1993 | Wert | | 363/25 |
| 5,747,972 A * | 5/1998 | Baretich et al. | | 323/223 |
| 6,020,729 A * | 2/2000 | Stratakos et al. | | 323/283 |
| 6,084,451 A * | 7/2000 | Choi et al. | | 327/172 |
| 6,259,292 B1 * | 7/2001 | Congdon | | 327/206 |
| 6,275,018 B1 * | 8/2001 | Telefus et al. | | 323/282 |
| 6,346,798 B1 * | 2/2002 | Passoni et al. | | 323/272 |
| 7,456,620 B2 * | 11/2008 | Maksimovic et al. | | 323/283 |

OTHER PUBLICATIONS

Jakobsen, Lars T. et al., "Digitally Controlled Offline Converter with Galvanic Isolation Based on an 8-bit Microcontroller", Industrial Electronics Society, IECON 2007, 33rd Annual Conference of the IEEE, (pp. 7), Nov. 2007.

Li, Qiong M., "A Low-Cost Configurable PWM Controller Using Programmable System-on-Chip", IEEE 34th Annual Power Electronics Specialist Conference, PESC Jun. 2003, (pp. 1169-1174).

* cited by examiner

*Primary Examiner* — Rajnikant Patel
(74) *Attorney, Agent, or Firm* — Cozen O'Connor

(57) ABSTRACT

A circuit arrangement for controlling power converters with a microcontroller comprises a digitally controlled pulse width modulation unit having an output, at which a switching signal for switching a power converter switch is present, wherein the circuit arrangement has an analog circuit part for switching on a power converter switch if the voltage across the power converter switch is substantially zero. A method for controlling a power converter with a microcontroller that comprises a digitally operating pulse width modulation unit for regulating the power converter, said unit having an output, at which a switching signal for switching a power converter switch is present, wherein the power converter switch is switched on in the operating state of the quasi resonant mode of the power converter by means of a fast analog circuit.

12 Claims, 14 Drawing Sheets

CIRCUIT ARRANGEMENT AND METHOD FOR CONTROLLING POWER CONVERTERS

RELATED APPLICATION

This application claims priority from U.S. Provisional Patent Application Serial No. 61/068,803 filed Mar. 10, 2008, the entire content of which is hereby incorporated by reference.

FIELD OF THE INVENTION

The invention relates to a circuit arrangement for controlling power converters with a microcontroller comprising a digitally controlled pulse width modulation unit having an output, at which a switching signal for switching a power converter switch is present.

BACKGROUND OF THE INVENTION

Modern flyback converters are operated in quasi resonant fashion during operation at nominal power, i.e. their specified continuous power, in order to achieve a high efficiency. The quasi resonant mode is, in principle, the operating point between intermittent and continuous operation at a variable frequency and a variable duty ratio. FIG. 12 shows the basic circuit diagram of such a converter 1. Low-loss switching at the power converter switch is achieved by the power converter switch, here a transistor Q1, being switched on if the voltage Vds across the power converter switch falls to almost zero volts after complete outputting of energy by the secondary circuit L2. If regulation to the primary current Ip of a converter transformer T1 is effected (current mode), Q1 is switched off if the primary current Ip has reached the setpoint value stipulated by a regulating system 2.

The profiles of currents and voltages are illustrated in FIG. 13. After the transistor Q1 has been switched on, the primary current Ip in the primary winding L1 of the converter transformer T1 rises until the setpoint value is reached. No secondary current Is flows in the secondary winding L2 at this point in time. After the transistor Q1 has been switched off, the primary current is zero, and a secondary current Is flows. If the secondary current has fallen to the value zero again, the transistor Q1 is switched on again. The voltage Vds has fallen to almost zero volts at the switching instant.

In this way, the regulating system 2 generates a pulse-width-modulated signal for controlling the transistor Q1. The pulse-width-modulated (PWM) signal is characterized by the frequency fpwm (fpwm=1/Tpwm) and the duty ratio D. Changing load conditions at the output (RL) and changing input voltage conditions lead to a variation of frequency fpwm and duty ratio D.

In conventional analog technology there are a multiplicity of pulse width modulation controllers which take account of this operating mode. Digital pulse width modulation units in microcontrollers are likewise able to ensure this operating mode.

When using cost-effective 8 bit microcontrollers and converter frequencies of between 250 kHz and 500 kHz, however, there is only a very limited choice of microcontrollers which comprise a pulse width modulation unit enabling said operating mode.

One example of such a microcontroller is the PIC16F785 from the company MICROCHIP (see PIC16F785/HV785Data Sheet, MICROCHIP DS41249D). This is an 8 bit CMOS microcontroller having an integrated pulse width modulation unit. Various operating modes are supported by the pulse width modulation unit, e.g. single-, dual-phase or single complementary PWM.

FIG. 14 shows the basic construction of the pulse width modulation unit 20 of such a microcontroller in the complementary output operating mode. A clock signal pwm_clk for a phase counter 202 is usually generated directly from the processor clock Fosc; a prescaler 204 can be configured. The maximum period duration of the switch-on phase is configured by Bit 0 to Bit 4 (PER <4:0>), in a pulse width modulation clock control register PWMCLK (not shown). The phase counter 202 increments its register by one upon each clock pwm_clk. If the value of the phase counter 202 (PWM_COUNT) reaches the value which is defined in PER and which represents the maximum period duration, the phase counter is reset to zero. A prerequisite for this is that the pulse width modulation unit 20 operates in the single master mode, that is to say that the pulse width modulation unit 20 operates by itself and other pulse width modulation units are not involved.

The mode of action of the duty ratio is defined in the pulse width modulation configuration register PWMCON1 (not shown). If an internal comparator 206 of the microcontroller is used for the comparison of the primary current with the setpoint-value regulator stipulation (current mode) and if the intention is to stipulate a maximum duty ratio at the minimum frequency of the pulse width modulation signal, it is necessary to end the switch-on time e.g. by precisely the comparator 206 of the microcontroller. A register PWMPH2 in combination with a gate 208 is additionally used in order to end the switch-on time of the present pulse width modulation period independently of the comparator 206. If the output of the gate 210 is not equal to zero and the output of the gate 208 is equal to zero, the switching output $S_{Q1}$ is activated if the phase counter PWM_COUNT has reached the value zero, and the next clock of the pulse width modulation clock is present. The switching output $S_{Q1}$ becomes inactive if comparator 206 is set as active or the phase counter PWM_COUNT has reached the value of the register PWMPH2 (PWM_COUNT=PWMPH2). Since the internal comparator outputs affect the resetting of the switch-on time of the pulse width modulation signal asynchronously, i.e. independently of the pulse width modulation clock, in this component there are no digital resolution errors with regard to the duty ratio. In this configuration, it is readily possible to drive the transistor Q1 of a flyback converter 1, although only in a continuous mode. Continuous mode hereinafter denotes a pulse-width-modulated operation mode with a variable duty ratio and fixed pulse width modulation frequency without low-loss switching of the transistor Q1. In addition, the pulse width modulation unit 20 has an input 212 enabling the pulse width modulation outputs to be inactivated when exceptional situations occur (e.g. overvoltage, overcurrent, etc). When such an event occurs, the phase counter 202 is reset to zero and the pulse width modulation outputs $S_{Q1}$ and $\overline{S}_{Q1}$ remain inactive. If the exceptional event disappears, the pulse width modulation unit 20 starts automatically and the pulse width modulation outputs are enabled again with a delay by a clock of the pulse width modulation clock (PWM_CLK) if the port PRSEN in the configuration register PWMCON0 is set.

With such a microcontroller it is possible, in principle, to react to the occurrence of a Vds event (reduction of the voltage Vds at the power converter switch Q1 towards zero volts) if transistor Q1 is switched off. This is effected via the above-mentioned input 212 for inactivating the outputs when exceptional events occur. On closer consideration, however, a temporal resolution problem arises: in order to notify the microcontroller that a Vds event has taken place, an active low signal having the pulse length t_tr is provided in said input.

The pulse length t_tr of the signal must have at least the length of the period duration of a pulse width modulation clock in order that the event is reliably registered in the pulse width modulation unit. Since the pulse is not generated synchronously with the pulse width modulation clock, the pulse length must even be longer than a period of the pulse width modulation clock, greater than 125 ns in the example of the microchip microcontroller with a clock frequency of 8 MHz and a prescaler ratio of 1:1 of the prescaler 204. Taking into account the microcontroller's RC oscillator, which does not have quartz crystal accuracy, a pulse length t_tr of 175 ns is defined, that is to say that a minimum of 1 pulse width modulation clock cycle or a maximum of 2 pulse width modulation clock cycles elapse for registering the Vds event in the pulse width modulation unit. After the registering, the period counter is reset to zero and the outputs of the pulse width modulation unit are deactivated. After the Vds event has disappeared, a further pulse width modulation clock cycle is required in order to reactivate the output PH1, that is to say that a minimum of 175 ns or a maximum of 300 ns elapse from the occurrence of the Vds event until the transistor Q1 is switched on. These two cases are illustrated in FIG. 15. At a converter frequency of 500 kHz, a period duration is 2 µs. In an exemplary embodiment that will be discussed in greater detail later, the time from a voltage zero crossing to the next voltage maximum is just 300 ns. Consequently, the temporal resolution for the quasi resonant mode is much too low, and the clock cycle times are too slow, to enable zero-voltage switching (ZVS) of the transistor Q1. Therefore, when using comparable microcontrollers having pulse width modulation units of similar performance, the problem arises that a flyback converter with the boundary conditions already mentioned cannot be used for quasi resonant operation with ZVS and a good efficiency associated therewith, because the pulse width modulation unit is not able to switch on the transistor Q1 at the required point in time.

SUMMARY OF THE INVENTION

One object of the present invention is to provide a circuit arrangement for controlling power converters, with a microcontroller comprising a digitally controlled pulse width modulation unit having an output, at which a switching signal for switching a power converter switch is present, wherein the circuit arrangement can drive a power converter in the quasi resonant mode at a high switching frequency in a low-loss manner.

A further object of the invention is to provide a method for controlling a power converter, with a microcontroller comprising a digitally operating pulse width modulation unit for regulating the power converter, said unit having an output, at which a switching signal for switching a power converter switch is present, by means of which the power converter can be driven in the quasi resonant mode at a high switching frequency in a low-loss manner.

The object regarding the circuit arrangement is achieved according to one aspect of the invention by a circuit arrangement for controlling power converters with a microcontroller comprising a digitally controlled pulse width modulation unit having an output, at which a switching signal for switching a power converter switch is present, wherein the circuit arrangement has an analog circuit part for switching on a power converter switch if the voltage across the power converter switch is substantially zero.

The object regarding the method is achieved according to another aspect of the invention by a method for controlling a power converter with a microcontroller comprising a digitally operating pulse width modulation unit for regulating the power converter, said unit having an output, at which a switching signal for switching a power converter switch is present, wherein the power converter switch is switched on in the operating state of the quasi resonant mode of the power converter by means of a fast analog circuit. In this case, the output of the pulse width modulation unit is connected to an output of the fast analog circuit via an OR logic combination in order to drive the power converter switch.

In a first embodiment, the transistor Q1 is switched on independently of the pulse width modulation unit of the MC if the Vds event occurs. For this purpose, a so-called prepulse is generated, which is longer than the delay time required by the microcontroller in order itself to switch on Q1 if a Vds event occurs. Said prepulse is logically ORed with the actual pulse width modulation output $S_{Q1}$ of the microcontroller and the transistor Q1 is driven with this signal. As a result, the pulse width modulation unit and also the analog circuit part can switch on the power converter switch; therefore, the circuit is functional even in operating states in which the analog circuit does not work.

In a further embodiment, the power converter switch is switched on by a first switching edge, which sets a bistable multivibrator, the output of which switches the power switch. In this case, the power converter switch can likewise be switched on by the pulse width modulation unit via an OR logic combination. The resetting of the bistable multivibrator is then effected once again by the pulse width modulation unit of the microcontroller, which thus performs the control of the power converter switch and thus the regulation of the power converter. This has the advantage that the pulse width modulation unit that is already present anyway in the microcontroller can concomitantly be used, which has a positive influence on the costs of the circuit arrangement.

If the first pulse or the first switching edge for switching on the power converter switch is generated by the analog circuit part only in the quasi resonant mode of the power converter, then no undesirable effects that might disturb the correct mode of operation of the power converter occur in the other operating modes.

If a second pulse or a second switching edge is generated essentially simultaneously with the first pulse or the first switching edge, then the zero crossing of the voltage across the power converter switch can be indicated to the pulse width modulation unit of the microcontroller simultaneously with the generation of the prepulse or the switching edge. This affords the advantage of better and more accurate functioning. In order to protect the power converter against malfunctions during switch-on and in other operating modes, the outputting of the first and of the second pulse or of the first and of the second switching edge is advantageously suppressed if the power converter switch is switched on.

If a circuit arrangement that generates a prepulse is employed, then the length of the first pulse should be configured in such a way as to reliably bridge a delay brought about by the pulse width modulation unit of the switching signal at the output with respect to the zero crossing of the voltage across the power converter switch. This protects the power converter against malfunctions that may cause an unpredictable behavior. In this case, the length of the second pulse should be configured in such a way that said pulse is reliably detected by the pulse width modulation unit of the microcontroller. This enables correct control of the power converter switch and consequently good regulation of the power converter.

If the generation of the first pulse or of the first switching edge for switching on a power converter switch is suppressed when a parameter of the power converter leaves a predetermined range, the regulating range of the circuit arrangement according to the invention can be considerably increased since situations with a very small load can then also be reliably corrected. If the parameter of the power converter is its output voltage, it can be used particularly well in electronic operating devices for gas discharge lamps. In the case of operating devices for xenon high-pressure discharge lamps, the predetermined output voltage range advantageously extends from 0 V to 200 V. Particularly preferably, the predetermined output voltage range extends from 0 V to 160 V. The correction of low-load states thus becomes even more accurate.

BRIEF DESCRIPTION OF THE DRAWINGS

The invention is explained in more detail below on the basis of exemplary embodiments. In the figures.

DETAILED DESCRIPTION OF THE DRAWINGS

Figure 1:
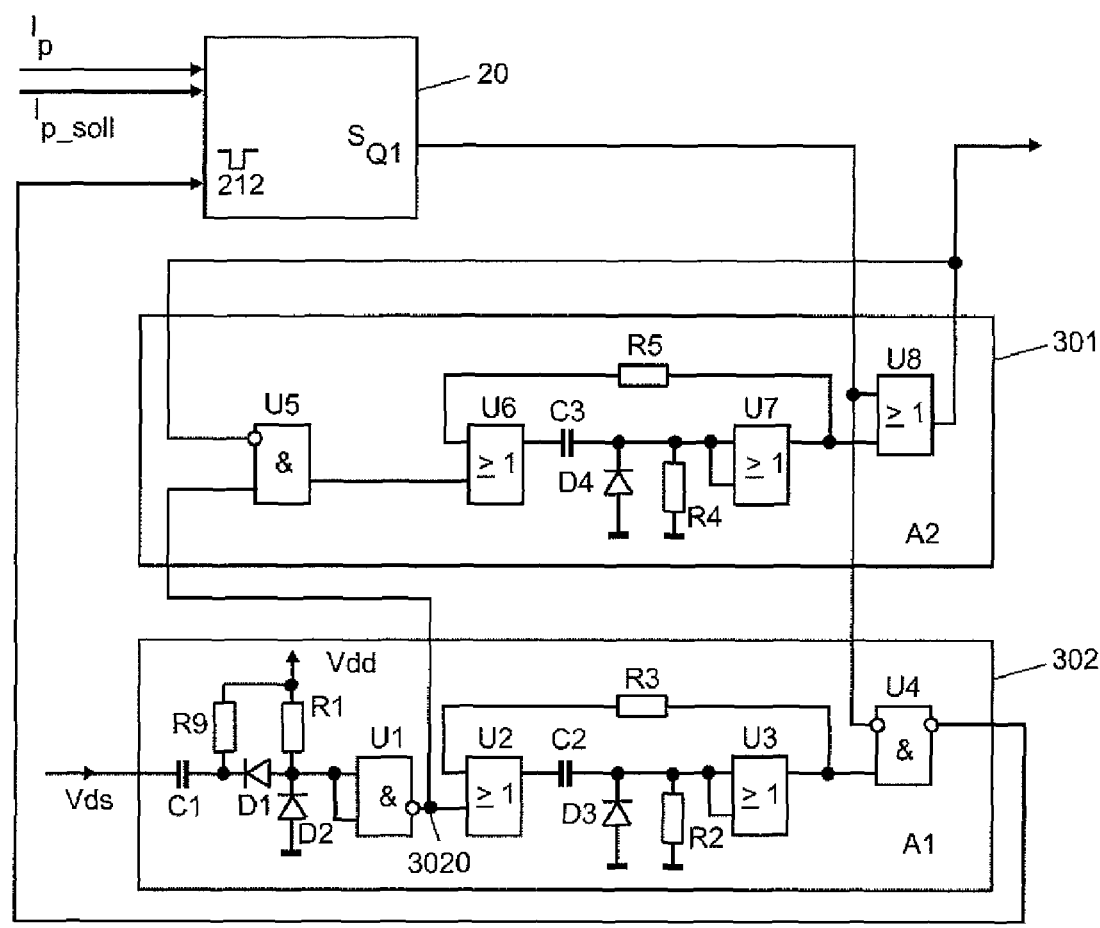
FIG. 1 shows a basic circuit for generating a prepulse for driving a power converter switch.
Figure 4:
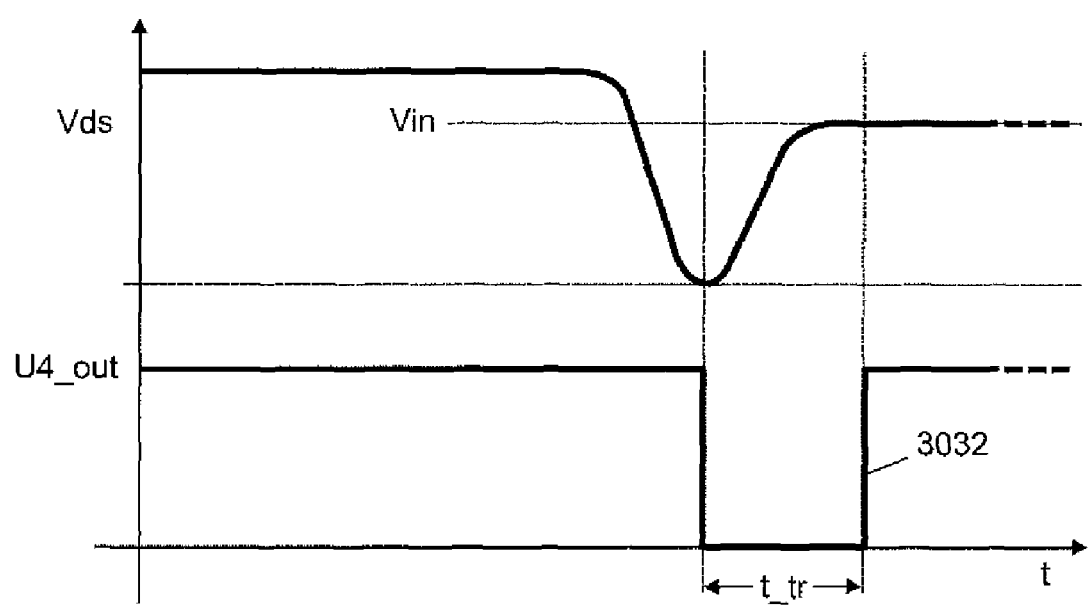
FIG. 4 shows the voltage signal at the power converter switch and the output signal of the circuit part of the circuit arrangement according to the invention that detects the voltage zero crossing at the power converter switch.

FIG. 1 shows the basic construction of the circuit arrangement according to an embodiment of the invention with a pulse width modulation unit 20 of a microcontroller. The voltage zero crossing of Vds is detected in the circuit part 302. The point in time for the occurrence of the Vds event is made available at the output 3020 of U1 in the form of a positive pulse 3022 (Vds pulse). The signal profiles for the Vds signal and the signal generated by the circuit part for the auto-shutdown event are illustrated in FIG. 4. As soon as the voltage at the transistor Q1 has collapsed to approximately zero volts, the circuit part 302 generates a signal U4_out with the pulse 3032 at its output. The optimum detection point for the Vds event can be dimensioned by means of R1, R9 and C1. Gate transit times arising during further processing can also be taken into account here. The detection circuit is then activated at a Vds voltage before the zero crossing such that after all the gate transit times, the converter transistor is then switched on at the voltage zero crossing. D1 decouples the power circuit from the regulating or control circuit of the circuit with regard to the voltage level differences. D2 prevents excessively high negative input voltages at the gate U1. The output of U1 is led to the input of the monostable multivibrator (comprising U2, U3, C2, R2, R3 and D3). The output of said monostable multivibrator at the gate U3 supplies the signal for the auto-shutdown event for the input 212 of the pulse width modulation unit 20 in the microcontroller.

Figure 2A:
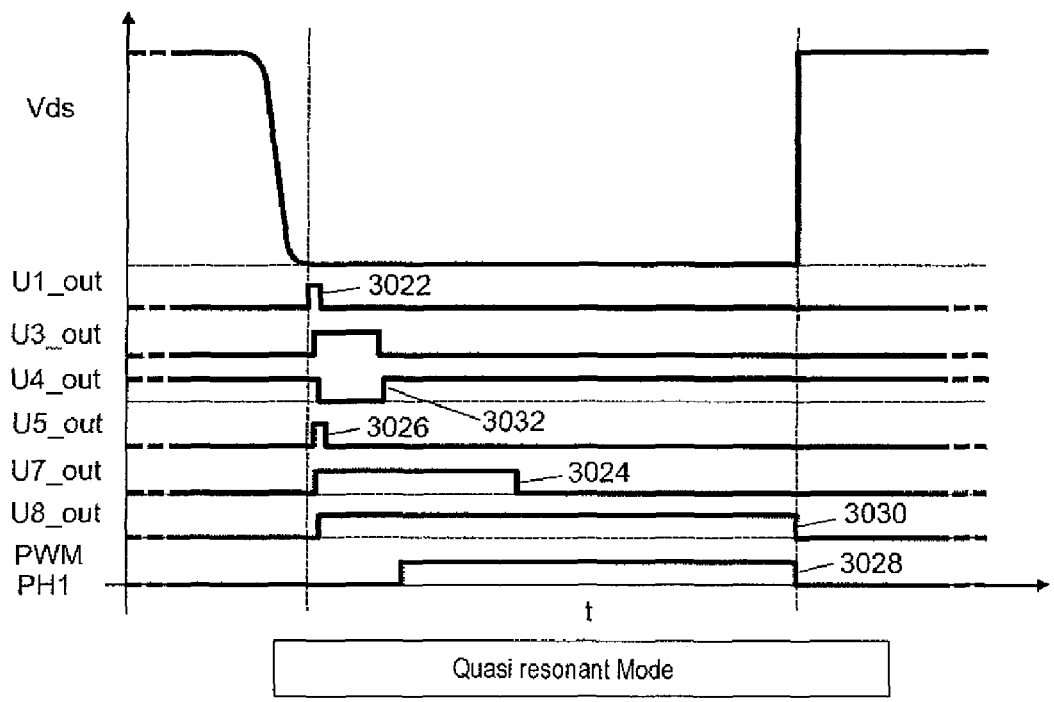
FIG. 2a shows the temporal profiles of some relevant signals in the quasi resonant mode.
Figure 2B:
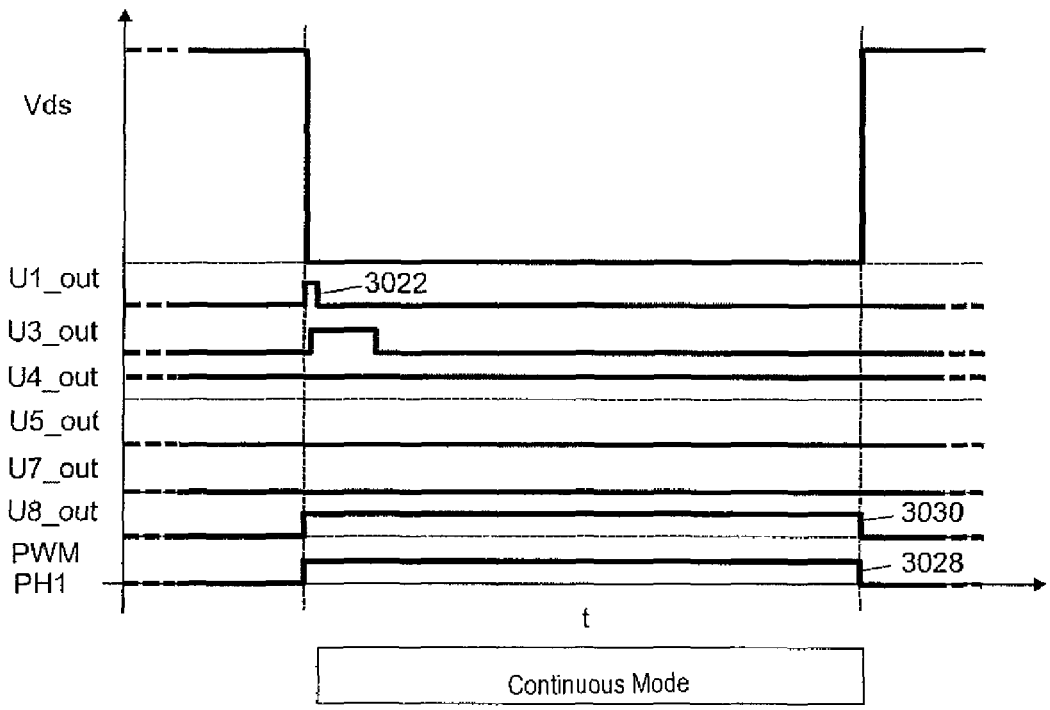
FIG. 2b shows the temporal profiles of some relevant signals in the continuous mode.

The signal U3_out having a pulse length of approximately 175 ns can be seen in FIGS. 2a and 2b. Gate U4 has the effect that the auto-shutdown event is set only when the pulse width modulation output $S_{Q1}$ is switched off; moreover, the required input level (active low) at the microcontroller is ensured.

The Vds pulse 3022 in the signal U1_out is input into a second circuit part 301 for generating the prepulse 3024 in the signal U7_out. The prepulse 3024 is only gnerated if the converter transistor Q1 is switched off. This is intended to prevent the prepulse from being generated in other operating modes, e.g. in the continuous mode as shown in FIG. 2b, or when the converter is started after the supply has been switched on. If the boundary condition of the quasi resonant mode as illustrated in FIG. 2a is provided, the gate U5 outputs a pulse 3026 in the signal U5_out which corresponds in principle to the pulse 3022, but is delayed by the gate transit time of the gate U5. If present-day conventional CMOS gates are used, the gate transit time varies only within the range of 40 ns-60 ns. The pulse 3026 is passed into the input of a further monostable multivibrator (comprising U6, U7, C3, R4, R5 and D4). The latter shapes the pulse 3024 from this and outputs it at its output U7. The signal U7_out with the pulse 3024 is then ORed with the output signal PWM PH1 of the output $S_{Q1}$ by means of a further gate U8. The output signal PWM PH1 contains the pulse 3028, and represents the pulse width modulation signal with belated switch-on instant of the converter transistor Q1. The two ORed pulses 3024 and 3028 produce the pulse 3030 in the signal U8_out, which represents the pulse width modulation signal with correct switch-on instant of the converter transistor Q1.

In the continuous mode, as already mentioned in the introduction, the generation of a prepulse is suppressed. In the continuous mode, the voltage Vds in the switched-off state of Q1 across the converter transistor Q1 never becomes zero since the converter transformer is not totally discharged. This has the effect that the secondary current Is never becomes zero during this time. Therefore, no Vds event is detected in the continuous mode. Only in special cases (e.g. at the switch-on instant) or in the case of interference is an incorrectly detected Vds event reliably prevented by the gate US. The latter suppresses the generation of a prepulse 3024 if the converter transistor Q1 is switched on, in order to prevent an incorrect switch-off instant of the transistor.

Figure 3:
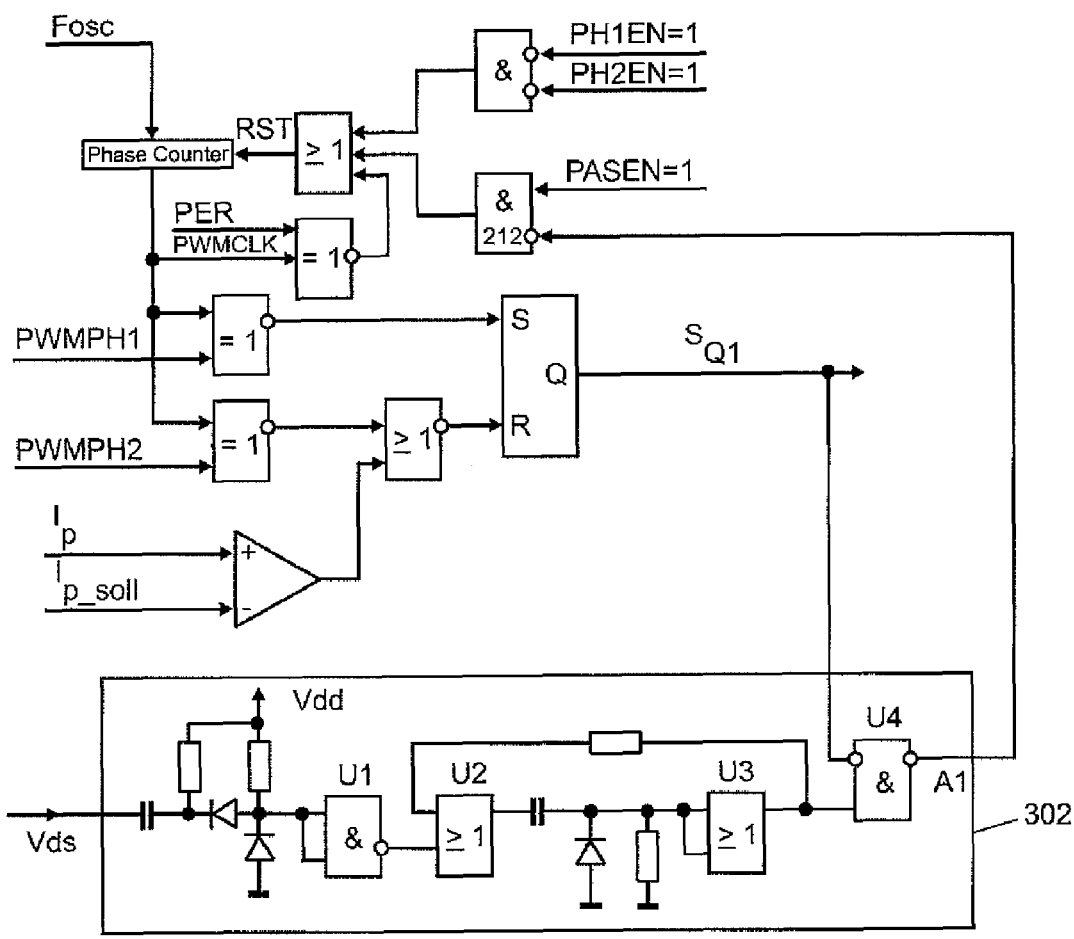
FIG. 3 shows a basic circuit of the circuit arrangement according to the invention with a pulse width modulation unit of a microcontroller with a circuit part that detects the voltage zero crossing at the power converter switch.

FIG. 3 shows the configuration of the pulse width modulation unit of the microcontroller for a flyback converter which, as mentioned above, uses the input 212 (auto-shutdown) to notify the pulse width modulation unit 20 of the back swing of the voltage Vds at the transistor Q1 after the outputting of energy in the secondary circuit. For this purpose, the above-described additional circuit 302, when the voltage Vds falls toward zero volts, generates a negative pulse 3032 of constant length and inputs it into the auto-shutdown input 212. The pulse 3032 is likewise only output if the transistor Q1 is switched off. It is only in this switching state of the flyback converter that it makes sense to output the pulse for ending the present period of the pulse width modulation signal to the pulse width modulation unit.

An example for illustrating the invention will be specified below. The circuit arrangement according to the invention can be employed e.g. in an electronic operating device for xenon-high pressure gas discharge lamps. For some time now these gas discharge lamps have been used to an increased extent in automobiles since they have advantages over conventional incandescent lamps owing to their high robustness and longevity and owing to their high efficiency. The high-pressure discharge lamp has a nominal power of 35 W. The electronic operating device converts the 12 V on-board voltage of an automobile to the lamp voltage necessary for lamp operation and supplies the necessary power. For this purpose, an 8-bit microcontroller from the company Microchip is implemented in the operating device and performs the necessary control tasks and the supervision by means of the pulse width modulation.

For the operation of the flyback converter implemented in the operating device for operating the 35 W high-pressure discharge lamp, the following boundary conditions are applicable in the quasi resonant mode:

Transistor switching frequency: 250 kHz to 500 kHz
Maximum switch-on time for the transistor Q1: 3.2 µs The pulse width modulation unit corresponds to the configuration illustrated in FIG. 3. The processor clock $F_{OSC}$ is clocked with the maximum possible frequency of 8 MHz of the internal oscillator. The use of an external oscillator is ruled out for cost reasons. The pulse width modulation registers are configured as follows:

| Register | Bit | Name | Value (binary) | Description |
| --- | --- | --- | --- | --- |
| PWMCON0 | <0> | PH1EN | 1 | Output PH1 is driven by pulse width modulation unit |
| | <1> | PH2EN | 0 | Output PH2 is not used for pulse width modulation function |
| | <3:2> | SYNC | 00 | SYNC input is not used, pulse width modulation unit operates as single master |
| | <4> | BLANK1 | 0 | Output $S_{Q1}$ is reset as soon as comparator trigger is active |
| | <5> | BLANK2 | 0 | Output $S_{Q1}$ is reset as soon as comparator trigger is active |
| | <6> | PASEN | 1 | PWM auto-shutdown function is activated |
| | <7> | PRSEN | 1 | The PWMASE shutdown bit register is automatically reset if the auto-shutdown event disappears; pulse width modulation unit subsequently starts automatically without software action |
| PWMCON1 | <4:0> | CMDLY | 00000 | Dead time for pulse width modulation output in the complementary mode is zero |
| | <6:5> | COMOD | 11 | Complementary mode; duty ratio is ended if the phase PWMPH2 is equal to the value of the phase counter or an event occurs at comparator C1 or C2 |
| PWMCLK | <4:0> | PER | 11111 | Period duration:<br>Period = 32/PWM_CLK;<br>@ PWM_CLK = Fosc:Prescaler<br>(Prescaler = 1) produces period duration of 4 µs (f = 250 kHz) |
| | <6:5> | PWMP | 00 | PWM_CLK = Fosc/1 |
| PWMPH1 | <4:0> | PH | 00000 | Phase PH1 becomes active if phase counter reaches the value zero |
| | <5> | C1EN | 1 | PH1 becomes inactive if output of the comparator C1 C1OUT becomes active |
| | <6> | C2EN | 0 | Comparator C2 has no influence on phase PH1 |
| | <7> | POL | 0 | Output $S_{Q1}$ phase PH1 is active-high |
| PWMPH2 | <4:0> | PH | 11001 | Phase PH1 is deactivated if phase counter reaches the value 25 if the output of comparator C1 does not become active beforehand;<br>25 × 1/PWM_CLK = 3.125 µs |
| | <5> | C1EN | 0 | Comparator C1 has no influence on phase PH2 |
| | <6> | C2EN | 0 | Comparator C2 has no influence on phase PH2 |
| | <7> | POL | 0 | Output phase PH2 is active-high |

If the flyback converter of the operating device is in the quasi resonant mode, no digital resolutions with regard to frequency and duty ratio can be detected with the circuit configuration according to the invention according to FIG. 1 with the use of the PIC16F785 from Microchip. The circuit behaves virtually like a comparable analog integrated current mode pulse width modulation component.

The circuit arrangement according to FIG. 1 has a crucial disadvantage, however. By virtue of the generation of the prepulse, there is a minimum duty ratio D relative to the pulse width modulation driving. Since the duration of the prepulse has a prescribed minimum length, this duty ratio rises as the frequency of the flyback converter rises in the quasi resonant mode. Given a maximum converter frequency of 500 kHz and a prepulse length of 325 ns, the minimum duty ratio is D=16.25%.

Xenon high-pressure discharge lamps are operated with a nominal power of 35 W in the normal running state. Directly after lamp ignition, a power is provided at the lamp, which power can rise to 2½ times the nominal power depending on the lamp temperature. During this time, the lamp voltage range is approximately 20 V to a maximum of 120 V, and is dependent on the lamp type used. Mercury-free lamps have approximately half the running voltage of a mercury-containing lamp. During the running phases, the circuit can be dimensioned in such a way that the minimum duty ratio does not pose a problem since it practically does not occur under the load conditions present.

Before lamp ignition, however, the output capacitor Cout (see FIG. 12) is charged to a voltage of approximately 400 V. If this voltage is reached, this voltage has to be corrected until the lamp ignition has taken place. During this phase, the load resistance RL is practically infinite in magnitude and it is necessary to prevent the generation of the prepulse since it is precisely in this operating state that the minimum duty ratio D would lead to an impermissible rise in the output voltage at Cout. A suitable criterion for preventing the prepulse is the detection of the voltage Vout at the output capacitor Cout. If the voltage reaches a specific maximum value which should lie above the lamp running voltage, the generation of the prepulse and the generation of the auto-shutdown event with respect to the pulse width modulation unit of the microcontroller are switched off. The pulse width modulation is then generated exclusively in the pulse width modulation unit of the microcontroller in the continuous mode (fixed frequency, no zero voltage switching ZVS at transistor Q1). Since the power to be transmitted is very low in this case, however, the power loss at the transistor Q1 plays a negligible part in this operating mode.

Figure 5:
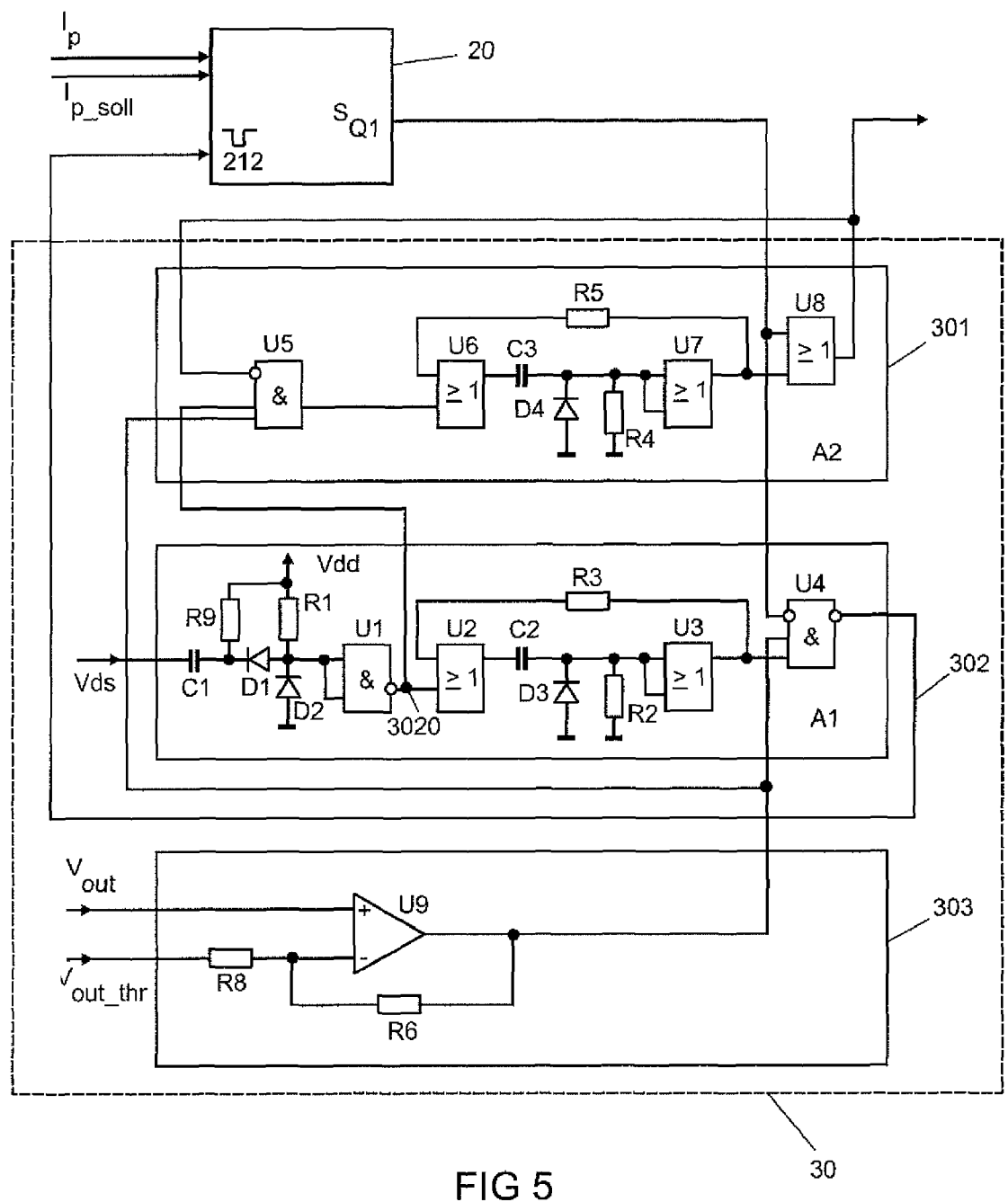
FIG. 5 shows the basic circuit according to FIG. 1 with an additional circuit part for suppressing the inventions prepulse/switching edge in low-load situations.

FIG. 5 shows a possible embodiment of the circuit part 303, which suppresses the generation of the prepulse. The output voltage Vout is measured and compared with a threshold value Vout_thr at the comparator U9. The required voltage divider is not indicated in the basic circuit diagram. If the voltage Vout is greater than the predetermined threshold value Vout_th, the comparator generates an active low reset signal. If the gates U4 and U5 are extended by an additional input, the prepulse generation and the generation of the shutdown signal with respect to the pulse width modulation unit of the microcontroller are suppressed in the case of a low level at said input.

In order to be able to set out the advantages of the invention in even greater detail, two practical exemplary embodiments of the circuit arrangement according to the invention are described below:

First Exemplary Embodiment

Figure 6:
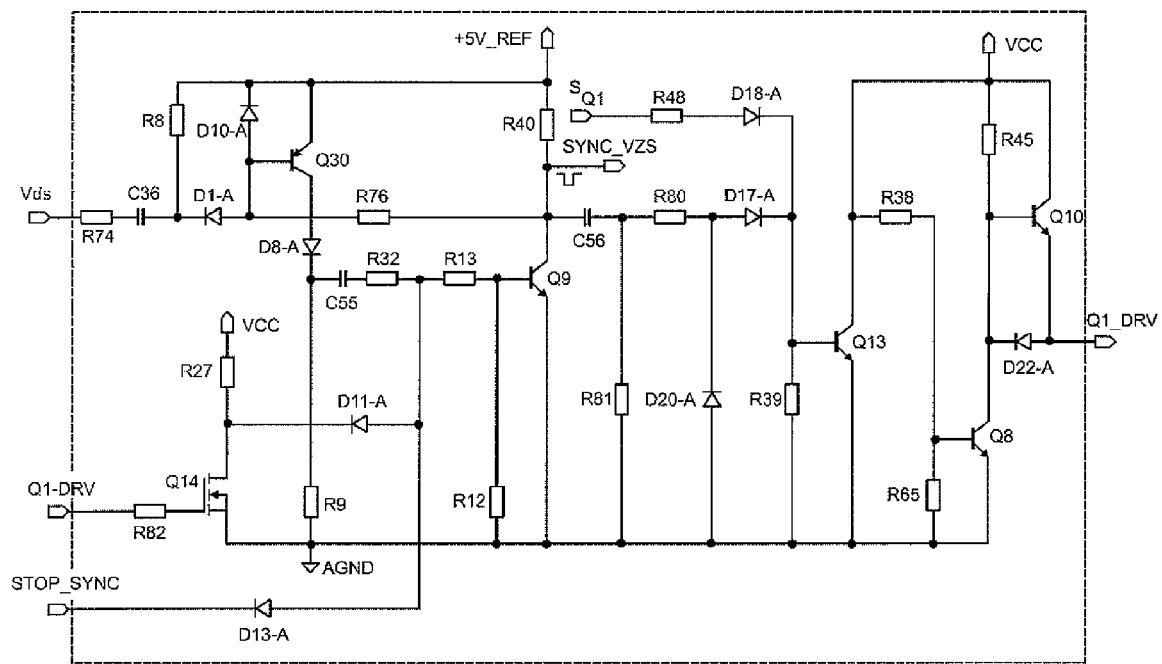
FIG. 6 shows the circuit diagram of a first exemplary embodiment of the circuit arrangement according to the invention with an analog construction using bipolar technology.

The circuit diagram of the first exemplary embodiment is shown in FIG. 6.

Figure 7:
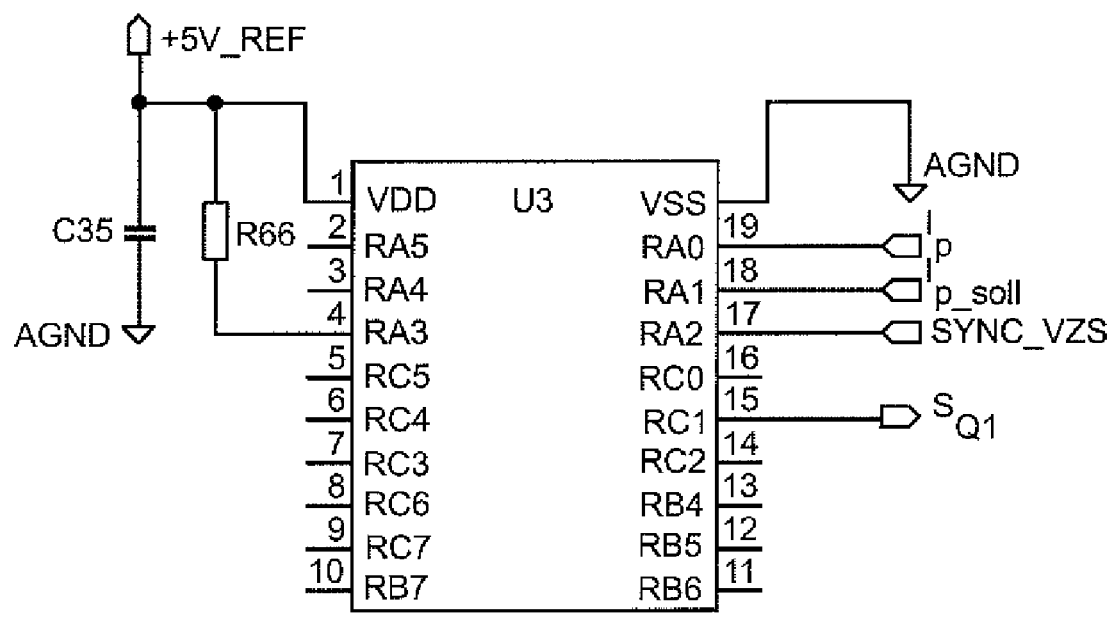
FIG. 7 shows the circuitry configuration of the microcontroller in the first exemplary embodiment.
Figure 12:
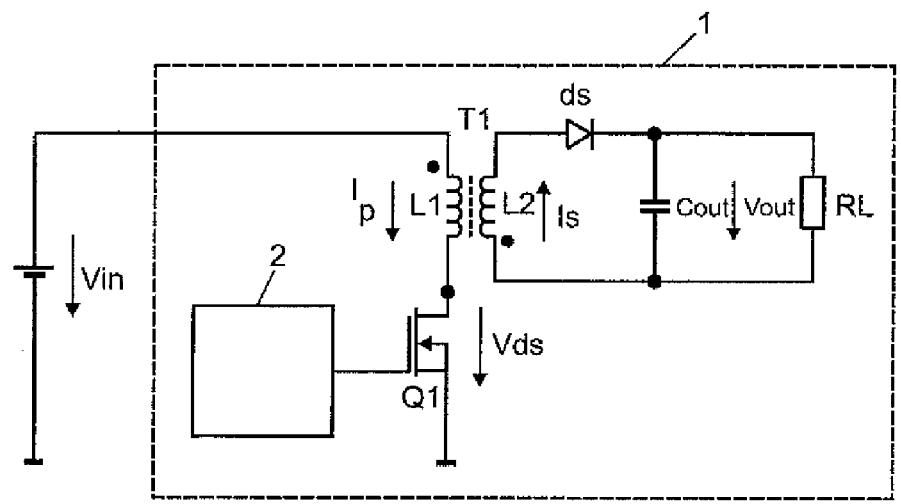
FIG. 12 shows a basic circuit of a flyback converter according to the prior art.
Figure 13:
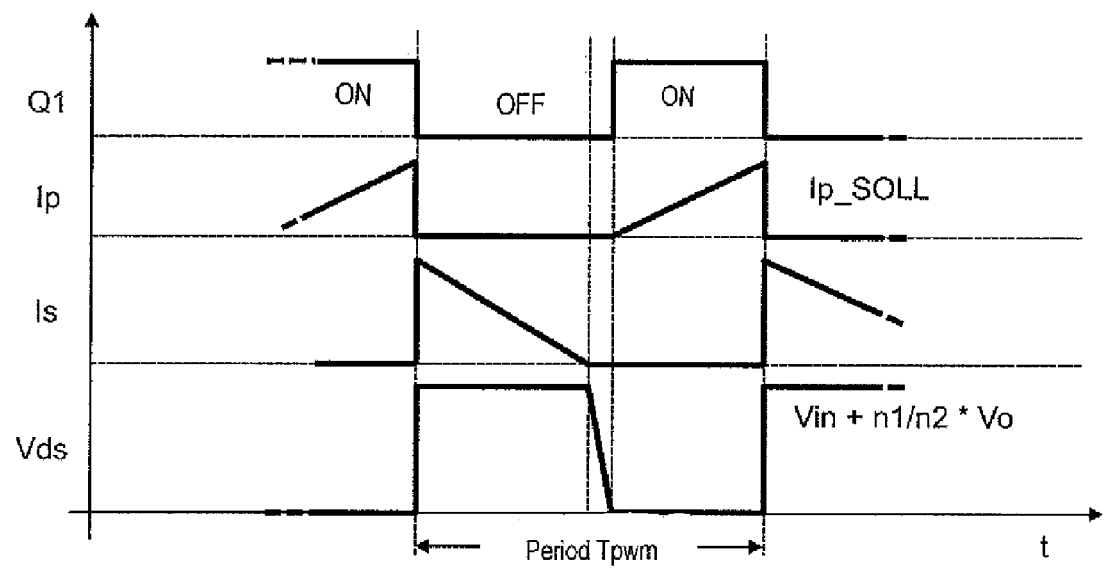
FIG. 13 shows some relevant signals of a flyback converter according to the prior art in the quasi resonant mode.
Figure 14:
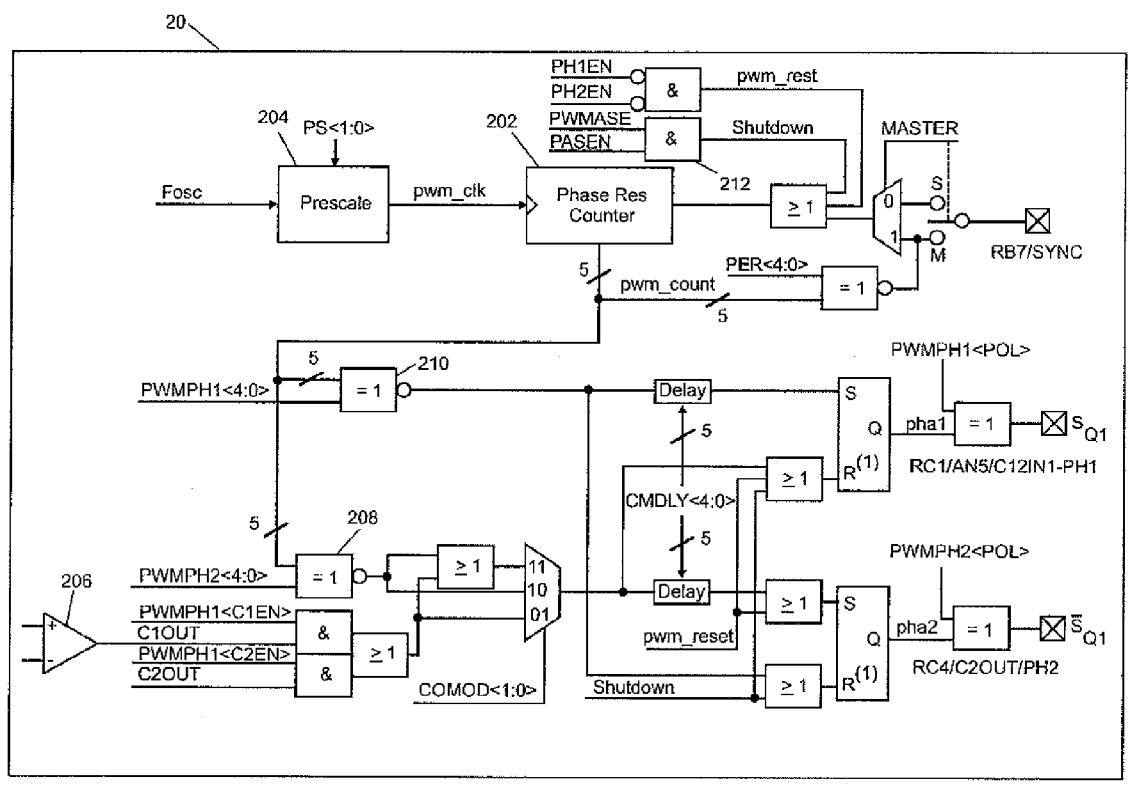
FIG. 14 shows a basic circuit of a pulse width modulation unit of a microcontroller according to the prior art.
Figure 15:
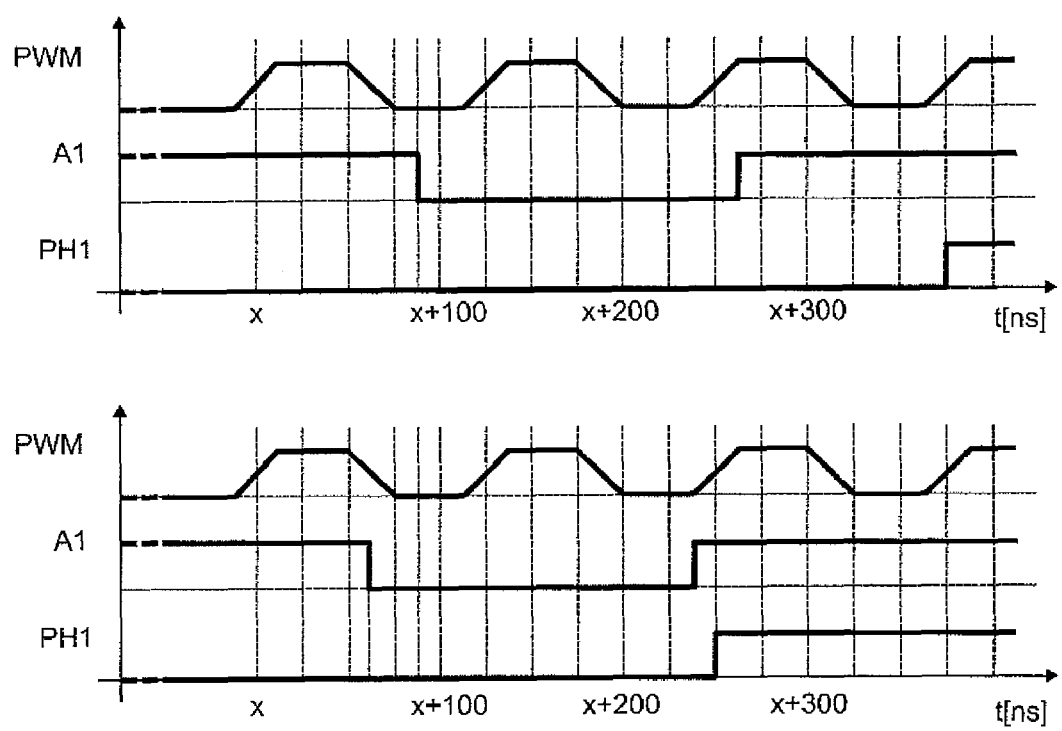
FIG. 15 shows some relevant signals for illustrating the delay time between voltage zero crossing and the switch-on of a power converter switch in a pulse width modulation unit of a microcontroller according to the prior art.

The circuitry configuration of a microcontroller of the type PIC16F785 that is also used here is illustrated in FIG. 7. The inputs and outputs of the circuit have the following meaning:

| | |
|---|---|
| +5 V_REF | Supply voltage 5 V DC |
| VCC | Supply voltage 12 V DC |
| AGND | Ground |
| Vds | Drain-source voltage at the transistor Q1 in accordance with FIG. 12 |
| /SYNC_VZS | Trigger signal for the auto-shutdown signal to the microcontroller |
| STOP_SYNC | Signal for constraining the continuous mode |
| $S_{Q1}$ | Pulse width modulation output $S_{Q1}$ of the microcontroller |
| Q1_DRV | Pulse width modulation signal for driving transistor Q1 |
| $I_P$ | Current $I_P$ through L1 in accordance with FIG. 12 |
| $I_p$_setpoint | Primary current setpoint stipulation $I_p$_setpoint from the regulator |

If the drain-source voltage Vds at the transistor Q1 falls, D1-a is turned on and transistor Q30 is switched on. The voltage between C55 and R32 increases abruptly and transistor Q9 is switched on via the voltage divider R32, R13 and R12. If D11 is in the on state, that is to say if the transistor Q1 is switched on, or if D13 is in the on state, that is to say the prepulse generation is suppressed on account of an excessively high output voltage Vout at the output of the flyback converter, the transistor Q9 remains switched off and no auto-shutdown signal is input into the microcontroller or no prepulse is generated. The auto-shutdown signal is made available at the collector of Q9. The switch-on duration of Q9 is essentially determined by C55, R32, R13 and R12. As long as Q9 is switched on, transistor Q30 is left switched on by the feedback of R76 in order that no further Vds events are registered. The switch-on duration of the active low pulse /SYNC_VZS is dimensioned at approximately 175 ns in order to guarantee a reliable read-in of the event in the pulse width modulation unit of the microcontroller.

In contrast to the preceding description of the basic principle, the prepulse is generated by the positive edge of the auto-shutdown event /SYNC_VZS, that is to say that it is not generated simultaneously with the negative edge of /SYNC_VZS. Relative to the minimum Vds voltage being reached in the quasi resonant mode with Q1 transistor switched off, the negative edge of /SYNC_VZS occurs about 175 ns before the Vds event is reached, and the prepulse must therefore be generated in a time-delayed manner in order to ensure an optimum efficiency. The length of the prepulse can be dimensioned by C56, R80, R81 and R39. A prepulse having a length of 350 ns is configured in the example. D18 and D17 form an OR gate; via D18 the pulse width modulation output $S_{Q1}$ is logically combined with the prepulse via D17. If the prepulse or the output of the microcontroller $S_{Q1}$ is active, Q13 is switched on. The matching of the level to VDD is effected by means of the transistor Q13. This is necessary for the driver driving of Q1. All elements downstream of Q13 represent a predriver for driving the driver of Q1.

The input signal $I_p$ and the signal CLC_OUT at the microcontroller are the input quantities for the internal comparator C1 of the microcontroller. The two signals determine the duty ratio of the pulse-width-modulated signal for driving Q1.

Figure 8A:
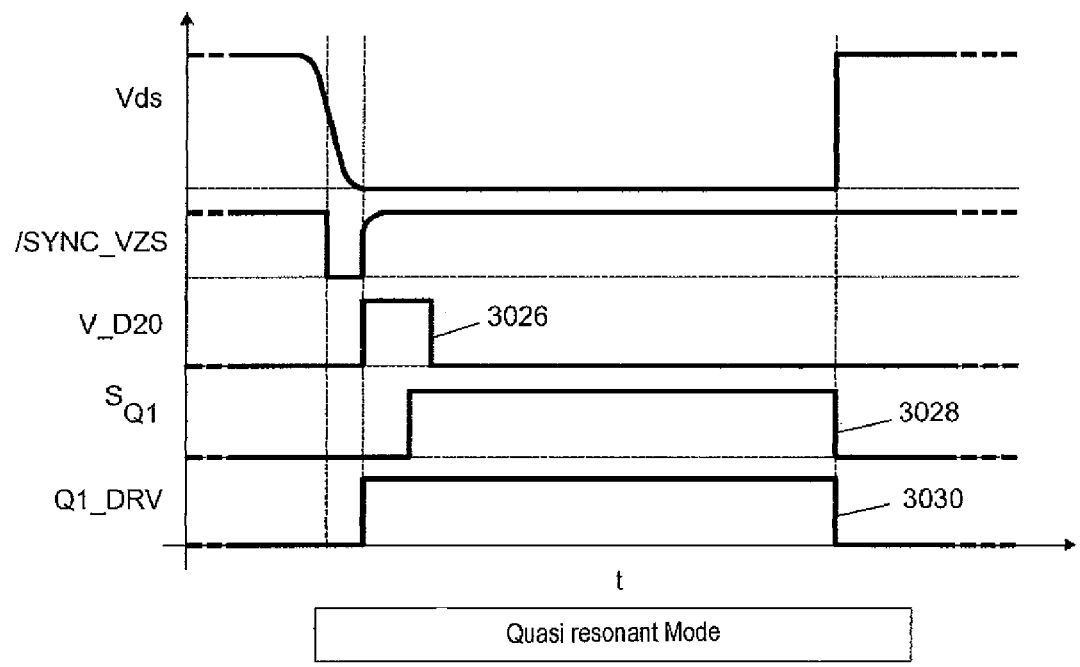
FIG. 8a shows some relevant signals of the first exemplary embodiment in the quasi resonant mode.
Figure 8B:
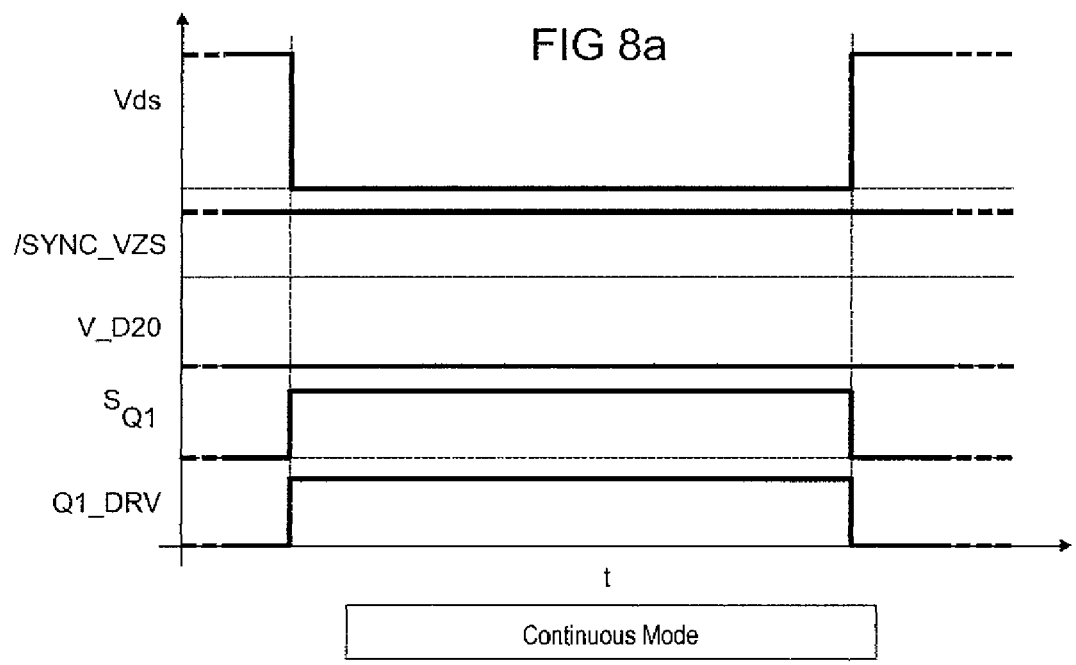
FIG. 8b shows some relevant signals of the first exemplary embodiment in the continuous mode.

FIG. 8 shows the temporal profile of selected signals in the quasi resonant mode and in the continuous mode. It can clearly be seen that the prepulse V_D20 according to the invention together with the output signal $S_{Q1}$ generated by the microcontroller supplies the drive signal Q1_DRV for the converter transistor. In the previous explanations, the signal in accordance with the basic illustration V_D20 was designated as U7_out and the signal Q1_DRV was designated as U8_out. The signal $S_{Q1}$ generated by the microcontroller is time-delayed with respect to the Vds event. The prepulse generated by the circuit arrangement according to the invention ensures that the converter transistor is switched on at the voltage zero crossing, while the microcontroller provides for the correct switch-off instant. In the continuous mode in FIG. 9b, the prepulse generation is suppressed since no Vds event has to be detected.

Second Exemplary Embodiment

The second exemplary embodiment differs from the first exemplary embodiment in terms of the circuit realization. Therefore, principally the circuit details will be discussed.

Figure 9:
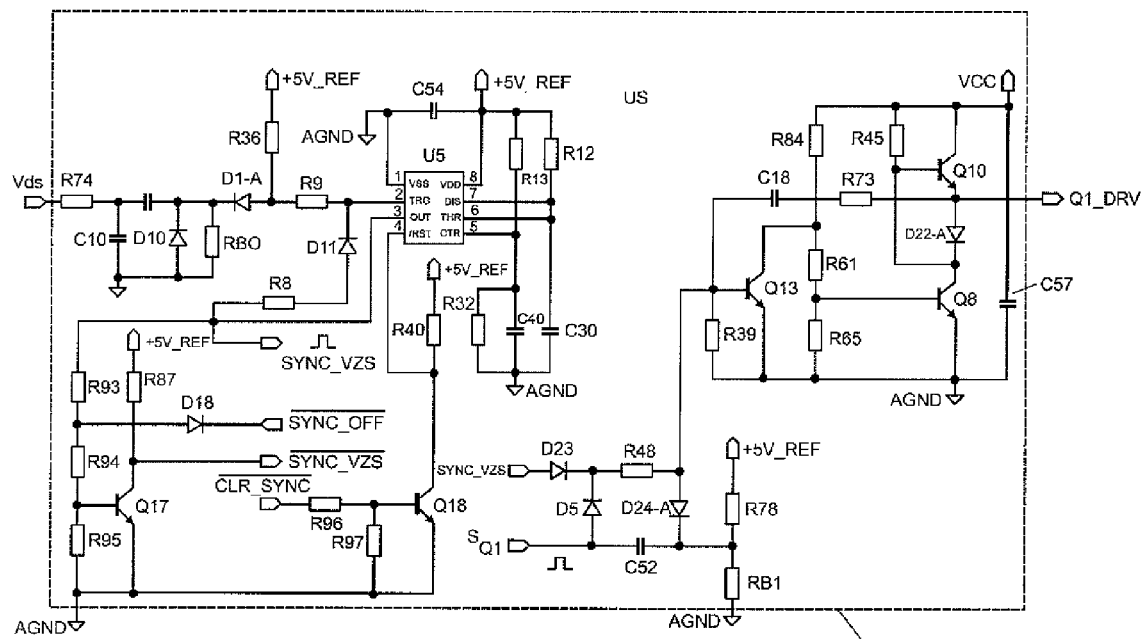
FIG. 9 shows the circuit diagram of a second exemplary embodiment of the circuit arrangement according to the invention, which has an analog construction with a timer component, and which operates with switching edges.
Figure 10:
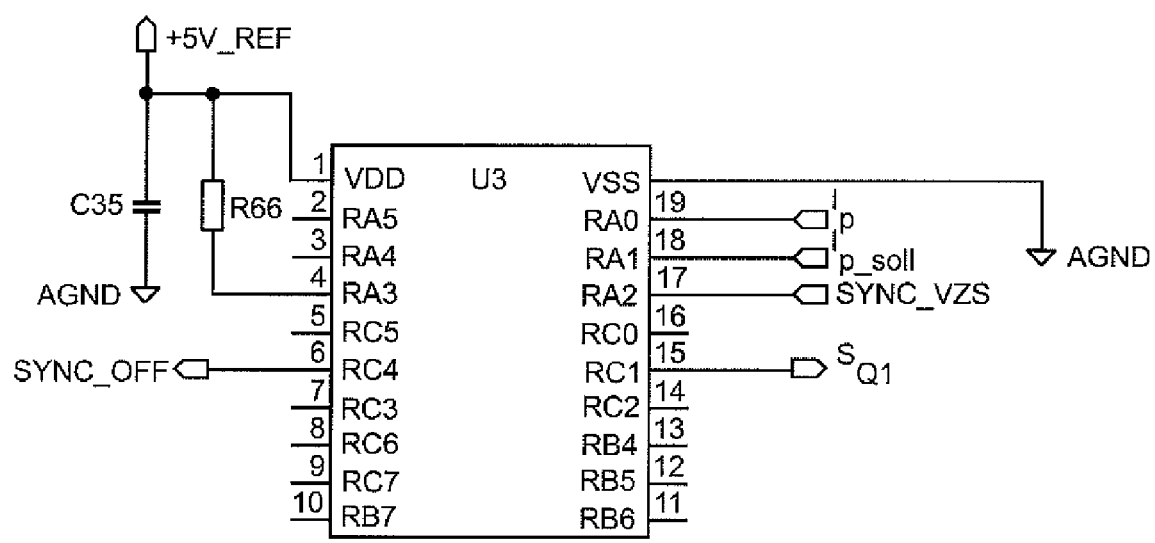
FIG. 10 shows the circuitry configuration of the microcontroller in the second exemplary embodiment.

FIG. 9 shows the circuit arrangement of the second exemplary embodiment. The circuitry configuration of the microcontroller PIC16F785 is illustrated in FIG. 10. The inputs and outputs of the circuit have the following meaning:

| | |
|---|---|
| +5 V_REF | Supply voltage 5 V DC |
| VCC | Supply voltage 12 V DC |
| AGND | Ground |
| VDS | Drain-source voltage at the transistor Q1 in accordance with FIG. 12 |
| SYNC_VZS | Signal negated with respect to /SYNC_OFF (see /SYNC_VZS) |
| /SYNC_VZS | Trigger signal for the auto-shutdown signal to the microcontroller |
| /SYNC_OFF | Complementary output $\overline{S}_{Q1}$ of the pulse width modulation unit in the microcontroller |
| /CLR_SYNC | Signal for constraining the continuous mode |
| $S_{Q1}$ | Pulse width modulation output $S_{Q1}$ of the microcontroller |
| Q1_DRV | Pulse width modulation signal for driving transistor Q1 |
| $I_P$ | Current $I_P$ through L1 in accordance with FIG. 12 |
| $I_p$_setpoint | Primary current setpoint stipulation $I_p$_setpoint from the regulator |

If the drain-source voltage Vds at the transistor Q1 falls, D1-a is turned on and generates an active low trigger pulse at the input of the timer component U5 (TLC555 Texas Instruments). The output Out of the timer component supplies at the output a signal SYNC_VZS with an active high pulse having a pulse length of approximately 175 ns. The feedback D11 and R8 from the output to the trigger input of the timer component U5 prevents the occurrence of new trigger events as long as the output Out is switched on.

Since the microcontroller requires an active low signal for the input of the auto-shutdown event, the negated signal of SYNC_VZS is output at the collector of Q17 if the output $S_{Q1}$ of the microcontroller is switched off. In the example, the complementary output $\overline{S}_{Q1}$ of the pulse width modulation unit in the microcontroller is used for this purpose (signal /SYNC_OFF). The output for $\overline{S}_{Q1}$ should be correspondingly configured during the initialization of the pulse width modulation unit in the microcontroller. If $\overline{S}_{Q1}$ is switched off, the output /SYNC_VZS supplies a high level. With the input /CLR_SYNC it is possible to prevent the generation of the auto-shutdown event, in order to constrain the continuous mode.

Transistor Q13 is switched on either by signal SYNC_VZS or the output of the pulse width modulation unit $S_{Q1}$ of the microcontroller. D23 and D5 logically OR the two signals with one another. If Q13 is switched on, Q8 switches off and Q10 switches on. The signal for driving the driver stage of transistor Q1 is tapped off at the emitter of Q10. The feedback via R73 and C18 to the base of the transistor Q13 ensures that Q13 remains switched on for a maximum time period (the maximum permissible switch-on time), but is reliably switched off again after this time. With the falling edge of the signal Q1_GO, the base of Q13 becomes slightly negative via C52 and D24 and Q13 switches off. As a result, the output Q1_DRV becomes active low again.

The advantage of the circuit arrangement of this second exemplary embodiment over the circuit arrangement of the first exemplary embodiment is that the circuit exhibits less temperature dependence. Moreover, the transistor Q1 is switched on simultaneously with the auto-shutdown event.

Figure 11A:
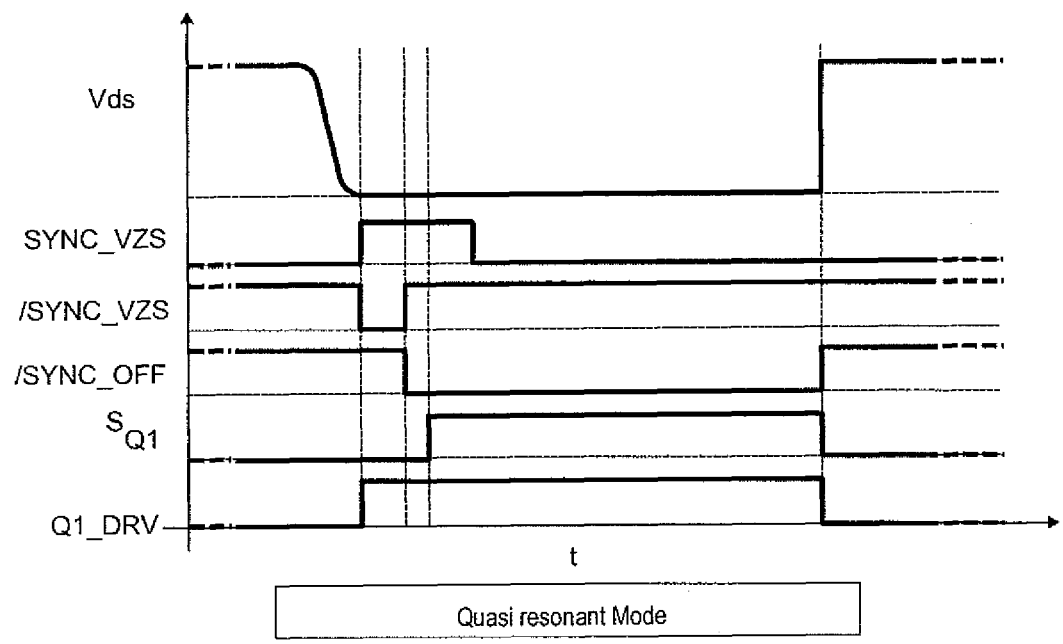
FIG. 11a shows some relevant signals of the second exemplary embodiment in the quasi resonant mode.
Figure 11B:
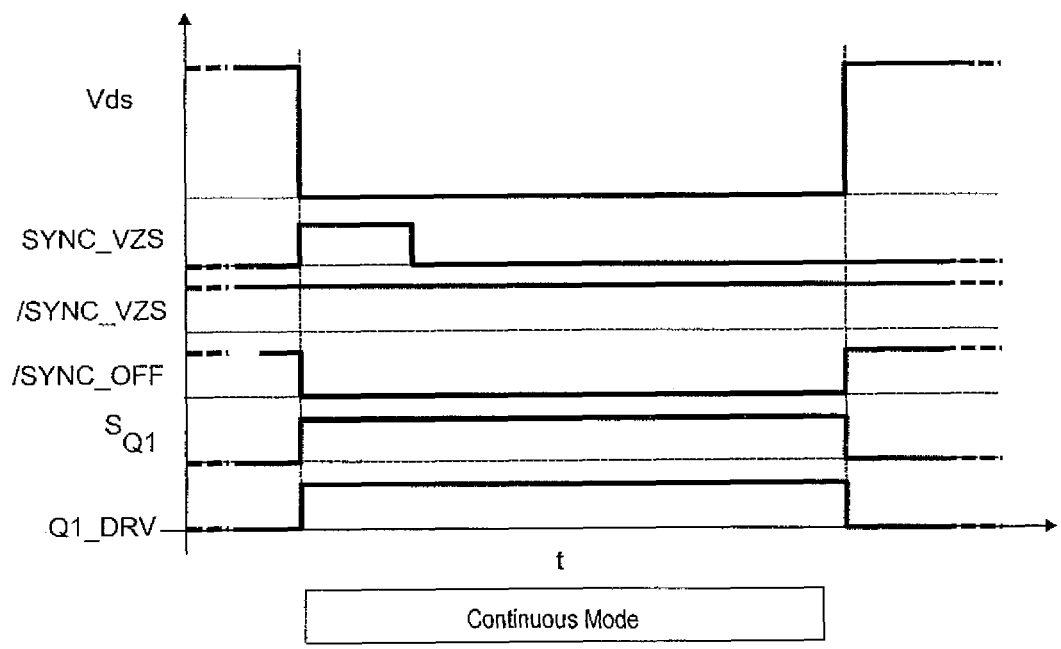
FIG. 11b shows some relevant signals of the second exemplary embodiment in the continuous mode.

FIG. 11 once again shows the temporal profile of above-described selected signals in the quasi resonant mode and in the continuous mode. In this case, the signal assignment with respect to the description of the basic principle is as in the first exemplary embodiment.

We claim:

1. A circuit arrangement for controlling power converters with a microcontroller comprising a digitally controlled pulse width modulation unit having an output, at which a switching signal for switching a power converter switch is present, wherein the circuit arrangement includes an analog circuit for switching on a power converter switch if the voltage across the power converter switch is substantially zero, wherein the power converter switch is switched on by a first pulse generated by the analog circuit part and the first pulse is combined with the switching signal of the pulse width modulation unit, said switching signal being present at the output of the pulse width modulation unit, by an OR logic combination.

2. The circuit arrangement as claimed in claim 1, wherein the power converter switch is switched on by a first switching edge, which sets a bistable multivibrator, the output of which switches the power switch.

3. The circuit arrangement as claimed in claim 1, wherein the first pulse or the first switching edge for switching on the power converter switch is generated by the analog circuit part only in the quasi resonant mode of the power converter.

4. The circuit arrangement as claimed in claim 1, wherein a second pulse or a second switching edge, which indicates to the pulse width modulation unit of the microcontroller the zero crossing of the voltage across the power converter switch, is generated substantially simultaneously with the first pulse or the first switching edge by the analog circuit part.

5. The circuit arrangement as claimed in claim 4, wherein the outputting of the first and of the second pulse or of the first and of the second switching edge is suppressed if the power converter switch is switched on.

6. The circuit arrangement as claimed in claim 1, wherein the length of the first pulse is configured in such a way as to reliably bridge a delay brought about by the pulse width modulation unit of the switching signal at the output with respect to the zero crossing of the voltage across the power converter switch.

7. The circuit arrangement as claimed in claim 4, wherein the length of the second pulse is configured in such a way that said pulse is reliably detected by the pulse width modulation unit of the microcontroller.

8. The circuit arrangement as claimed in claim 1, wherein the generation of the first pulse or of the first switching edge for switching on a power converter switch is suppressed when a parameter of the power converter leaves a predetermined range.

9. The circuit arrangement as claimed in claim 8, wherein the parameter of the power converter is its output voltage.

10. The circuit arrangement as claimed in claim 9, wherein the predetermined output voltage range extends from 0 V to 300 V.

11. The circuit arrangement as claimed in claim 9, wherein the predetermined output voltage range extends from 0 V to 200 V.

12. A method for controlling a power converter with a microcontroller comprising a digitally operating pulse width modulation unit for regulating the power converter, said unit having an output, at which a switching signal for switching a power converter switch is present, wherein the power converter switch is switched on in the operating state of the quasi resonant mode of the power converter by means of a fast analog circuit, wherein the output of the pulse width modulation unit is connected to an output of the fast analog circuit by an OR logic combination in order to drive the power converter switch.

* * * * *